(12) United States Patent
Rychen

(10) Patent No.: US 8,884,222 B2
(45) Date of Patent: Nov. 11, 2014

(54) MOUNT FOR A SCANNING PROBE SENSOR PACKAGE, SCANNING PROBE SENSOR PACKAGE, SCANNING PROBE MICROSCOPE AND METHOD OF MOUNTING OR DISMOUNTING A SCANNING PROBE SENSOR PACKAGE

(75) Inventor: Joerg Rychen, Zuerich (CH)

(73) Assignee: SPECS Surface Nano Analysis GmbH, Berlin (DE)

( * ) Notice: Subject to any disclaimer, the term of this patent is extended or adjusted under 35 U.S.C. 154(b) by 85 days.

(21) Appl. No.: 13/502,171

(22) PCT Filed: Oct. 5, 2010

(86) PCT No.: PCT/EP2010/064832
§ 371 (c)(1),
(2), (4) Date: Aug. 28, 2012

(87) PCT Pub. No.: WO2011/045208
PCT Pub. Date: Apr. 21, 2011

(65) Prior Publication Data
US 2012/0324608 A1   Dec. 20, 2012

(30) Foreign Application Priority Data
Oct. 16, 2009  (EP) .................................... 09075467

(51) Int. Cl.
*G01N 23/00* (2006.01)
*G01Q 70/02* (2010.01)
*B82Y 35/00* (2011.01)

(52) U.S. Cl.
CPC *G01Q 70/02* (2013.01); *B82Y 35/00* (2013.01)
USPC . 250/306; 250/307; 250/440.11; 250/441.11; 250/442.11

(58) Field of Classification Search
CPC ............................... G01Q 60/22; G01Q 60/38
USPC ........... 250/306, 307, 440.11, 441.11, 442.11
See application file for complete search history.

(56) References Cited

U.S. PATENT DOCUMENTS

| 5,376,790 A | 12/1994 | Linker et al. |
| 5,701,381 A | 12/1997 | Saurenbach et al. |

(Continued)

FOREIGN PATENT DOCUMENTS

| JP | 02-056972 A | 2/1990 |
| JP | H3-135701 A | 6/1991 |

(Continued)

OTHER PUBLICATIONS

Kazuo Yokoyama et al., "In Situ Tip Exchange Mechanism for the Demuth-Type Scanning Tunneling Microscope", Journal of Vacuum Science and Technology, Part B, AVS/AIP, vol. 9, No. 2, part 2, Mar. 1, 1991, pp. 623-625.

(Continued)

*Primary Examiner* — Nicole Ippolito
*Assistant Examiner* — Hanway Chang
(74) *Attorney, Agent, or Firm* — Rothwell, Figg, Ernst & Manbeck, P.C.

(57) ABSTRACT

A mount for a scanning probe sensor package (27) comprises a support structure (1, 5) defining a plane within the mount and at least one movable snap joint element (9) designed for interacting with a respective counterpart (43) in a scanning probe sensor package (27). The snap joint element (9) is movable to a first position in which it exerts a force on a mounted scanning probe sensor package (27) so as to force said scanning probe sensor package (27) in a normal direction of said plane towards the support structure (1,5) and to a second position in which it allows a scanning probe sensor package (27) to be mounted to or dismounted from the support structure (1, 5) along normal direction of said plane.

16 Claims, 7 Drawing Sheets

(56) References Cited

U.S. PATENT DOCUMENTS

| | | | |
|---|---|---|---|
| 5,861,624 A | 1/1999 | Alexander et al. | |
| 6,748,794 B2 * | 6/2004 | Ray | 73/105 |
| 2007/0180889 A1 | 8/2007 | Murayama et al. | |

FOREIGN PATENT DOCUMENTS

| | | |
|---|---|---|
| JP | 10 267948 A | 10/1998 |
| JP | 11-64347 | 3/1999 |
| WO | 2005034134 A1 | 4/2005 |

OTHER PUBLICATIONS

"Tip Revolver for Scanning Tunneling Microscope" IBM Technical Disclosure Bulletin, International Business Machines Corp. vol. 31, No. 9, Feb. 1, 1989, p. 216.

Notice of Reasons for Rejection issued in Japanese Patent Application No. 2012-533570 issued Mar. 25, 2014 (English Translation (3 pgs).

* cited by examiner

MOUNT FOR A SCANNING PROBE SENSOR PACKAGE, SCANNING PROBE SENSOR PACKAGE, SCANNING PROBE MICROSCOPE AND METHOD OF MOUNTING OR DISMOUNTING A SCANNING PROBE SENSOR PACKAGE

CROSS REFERENCE TO RELATED APPLICATION

This application is a 35 U.S.C. 371 National Phase Entry Application from PCT/EP2010/064832, filed Oct. 5, 2010, which claims the benefit of European Patent Application No. 09 075 467.2 filed on Oct. 16, 2009, the disclosure of which is incorporated herein in its entirety by reference.

The present invention relates to a mount for a scanning probe sensor, to a scanning probe sensor package and to a scanning probe microscope. In addition, the invention relates to mounting or dismounting a scanning probe sensor package to/from a mount.

In scanning probe applications such as, for example, scanning tunneling microscopy, atomic force microscopy, and related techniques, atomically sharp tips are used for sensing tunneling currents or forces such as electrostatic forces, magnetic forces, etc. between the tip and the surface to be probed. Since atomically sharp tips are required for obtaining high quality surface images a replacement of a sensor or sensor package containing the tip is required after a while.

Since such scanning probe sensors or sensor packages are typically small and damageable handling of these devices is often delicate. Moreover, scanning probe sensors often need to be precisely positioned within a mount. Various mounts dealing with these circumstances have been proposed.

U.S. Pat. No. 5,701,381 discloses a mounting arrangement for a probe tip of a scanning force or tunneling microscope in which the displacement of the tip due to atomic forces or the like is detected by interferometric means. To allow for the interferometric measurement an optical fiber is guided through a ferrule. The tip of the scanning probe microscope is located at a plug-in structure that comprises a leaf which can be slipped onto the ferrule. The tip is located such that its free end is located opposite to the exit end of the optical fiber. A ferrule holder or the ferrule itself has a shoulder stop for engagement by the leaf to achieve an accurate positioning. The leaf may include clamping elements which permit their clamping onto the ferrule by means of a clamping bolt.

US 2007/0180889 A1 describes a probe replacement method for scanning probe microscopes in which a cantilever with a tip at its free end is mounted to a cantilever holder by use of a vacuum. However, this kind of holding the cantilever can not be applied if the scanning probe microscope is to be used under vacuum.

WO 2005/034134 A1 describes a probe arrangement for a raster probe instrument in which a chip comprising two cantilevers is held by a clamping device that comprises four yaws which overlap with slant faces of the chip.

U.S. Pat. No. 5,376,790 describes a kinematic mount for a probe containing a cartridge where the cartridge can be moved laterally into the mount and fixed by spring clips urging the cartridge towards balls interacting with elements of the cartridge for precisely positioning the cartridge within the mounting head.

U.S. Pat. No. 5,861,624 describes an atomic force microscope system which can be incorporated into or attached to an optical microscope. The atomic force microscope comprises a base plate which can be clamped between a mounting adaptor and an end cap by screwing the end cap onto the adaptor. A spring is biasing the atomic force microscope against an inner surface of the end cap. The mounting adaptor can then be mounted on a lens turret of a microscope.

With respect to the mentioned prior art it is an objective of the present invention to provide an advantageous mount for a scanning probe sensor package and a scanning probe sensor package for use with the mount. It is a further objective of the present invention to provide an advantageous scanning probe microscope. It is a still further objective of the present invention to provide an advantageous method of mounting or dismounting a scanning probe sensor package to/from a mount.

The mentioned objectives are solved by a mount for a scanning probe sensor package as claimed in claim 1 or claim 13, a scanning probe sensor package as claimed in claim 9, a scanning probe microscope as claimed in claim 11 and a method of mounting or dismounting a scanning probe sensor package to a mount, as claimed in claim 12 or 15, respectively. The depending claims contain further developments of the invention.

An inventive mount for a scanning probe sensor package comprises a support structure for a scanning probe sensor package said support structure defining a plane within the mount. It further comprises at least one movable snap joint element designed for interacting with a respective counter part in a scanning probe sensor package. The snap joint element is movable to a first position in which it exerts a force on a mounted scanning probe sensor package so as to force that scanning probe sensor package in a normal direction of said plane towards the support structure. In addition, the snap joint element is movable to a second position in which it allows a scanning probe sensor package to be mounted to, or dismounted from, the support structure along the normal direction of said plane. The mount is, preferably, implemented as kinematic mount.

One kind of mount used for scanning probe sensor packages is a so called kinematic mount which embodies a technique of removably mounting an object relative to another object with a very high degree of reproducibility in positioning both objects relative to each other. For example, in such a kinematic mount, three balls may define a plane with respect to which a second body will be adjusted by means of three slots into which the balls partly project when the second part is mounted to the first part thereby fixing the relative orientation of the second part relative to the first part. An example for a kinematic mount is described in U.S. Pat. No. 5,376,790.

The present invention is based on the finding that mounting a sensor package in a kinematic mount along a direction parallel to a plane defined by this mount, as it is described in U.S. Pat. No. 5,376,790, some parts of the sensor package or the mount, like electrical contacts, may be damaged by the lateral movement with respect to the plane through unintentional contacting parts. Such damaging is unlikely if mounting the sensor package is accomplished along the normal direction of the plane. In addition, wearing of balls in a kinetic mount can be reduced. Moreover, mounting along the normal direction also offers the possibility of providing tiny pins as electrical contacts which would be difficlt to handle with a lateral insertion motion of the sensor package with respect to the plane.

Holding a scanning probe sensor package within the receptacle once it is mounted can be accomplished by bringing the snap joint element into the first position in which it exerts a force directly or indirectly forcing the sensor package along the normal direction towards the plane. Indirectly forcing the sensor package towards the plane may, e.g., achieved by a superposition of forces leading to a resulting force along the normal direction. Hence, the inventive mount reduces the risk of damaging tiny structures located at the mount or at the sensor package to be mounted even if those structures project over a mounting surface.

The snap joint element may be located at a movable element that is biased towards the centre of the support structure by a spring force. A spring force can be precisely dimensioned by using a spring or some other resilient element having a suitable spring constant so that the force applied to the scanning probe sensor package is highly reproducible compared to a manually set force, e.g. a force that is set by a user by means of a clamping bolt. In a practical design said movable element may comprise a resiliently bendable lever element that has a stationary section which is fixed in its location with respect to the support structure, for example by fixing the stationary section directly to the support structure, and a free end section at which the snap joint element is located. The resiliently bendable lever element then extends substantially in parallel to the normal direction to said plane and is formed so as to bias the free end section with the snap joint element towards the centre of the support structure. The spring force is then provided by the resilience of the lever element. Since the movable element and the element providing the spring force are identical in this implementation the number of elements for realizing the snap joint, element and hence the complexity of the snap joint element, can be kept small.

In order to reduce friction especially when the scanning probe sensor package itself is used for bringing the snap joint element from the first position into the second position against the spring force the snap joint element may show rotational symmetry about a symmetry axis and may be rotatably mounted with its symmetry axis being its rotation axis and with the rotation axis being oriented perpendicular with respect to the normal direction of the plane defined within the mount so that only a rolling resistance between the snap joint element and the sensor package is to be overcome during mounting and dismounting the sensor package.

The mount may comprise at least three movable snap joint elements that are evenly distributed around a rim of the support structure. This design allows for exerting an evenly distributed force on a mounted sensor package towards the plane defined within the mount.

In an alternative design, the mount comprises at least one coiled annular spring located at the periphery of the support structure so as to surround the support structure. The sections of the coils which show towards the centre of the support structure then form the snap joint elements. When, in this design, a scanning probe sensor package is mounted to the mount the coils will be compressed, e.g. by a section of the sensor package having larger dimensions then the rest of the package, so as to move the inner sections of the coils, i.e. the sections that show towards the centre of the support structure, outwards to the second position. When the larger section of the sensor package has passed the coiled annular spring the coils can snap back to their original first position and prevent the extended part of the sensor package from moving away from the support structure along the normal direction through a force component parallel to the normal direction of said plane.

Although the snap joint elements can, in principle, be moved from the first position to the second position by use of a scanning probe sensor package to be mounted or dismounted it is advantageous that the sensor package can be mounted and/or dismounted without contacting the snap joint elements. This can be achieved by an actuation element arranged for acting on the at least once snap joint element so as to allow moving the snap joint element from the first position to the second position and vice versa by actuating the actuation element. Since moving of the snap joint element is then provided by other means than the sensor package itself it becomes possible to mount or dismount the sensor package without any contact with the snap joint elements before the sensor package is in its final position. Hence, the risk of damaging the sensor package and/or the mount during mounting or dismounting a sensor package can be further reduced.

In case the snap joint element is located at a movable element as it has been described above the actuation element may be arranged so as to act on the movable element and/or the snap joint element to bend the lever element away from the centre of the support structure against the mentioned spring force when the actuation element is actuated. In case the snap joint element is located at the free end of a resiliently bendable lever element the actuation element may be arranged so as to act on this resiliently bendable lever element and/or the snap joint element for bending the lever element against the force biasing it towards the centre of the support structure.

The actuation element may, in particular, be movable back and forth in a direction parallel to the normal direction of said plane defined with the mount. In such a construction, the actuation element can be realized even if the available space around the mount is restricted in lateral direction. The actuation element may comprise at least one guiding element acting on said movable element and/or said snap joint element where the guiding element defines the distance the snap joint element is moved away from the centre of the support structure depending on the position of the actuation element within its back and forth movement.

An inventive scanning probe sensor package comprises a sensor element and a base to which the sensor element is fixed. It may further comprise a handle section extending from the base for allowing handling the sensor package without touching damageable parts of the sensor package. The base comprises at least once snap joint section which is designed to interact with a snap joint element of an inventive mount. This snap joint section has a dimension that is chosen such that it can pass the at least one snap joint element along the normal direction when the snap joint element is its second position but can not pass the at least one snap joint element along the normal direction when the snap joint element is in its first position. Furthermore, the dimension of the snap joint section is chosen such that the snap joint element can exert a force towards the plane defined within the mount in normal direction of said plane when the snap joint section has passed the snap joint element towards said plane. In particular the base may be formed by a base plate which comprises at least one rim section which forms said at least one snap joint section. The diameter of the plate and the thickness of the rim can then be chosen such as to fulfill the above requirements. Such an inventive scanning probe sensor package is especially adapted for use in conjunction with an inventive mount in order to realize the advantages provided by the mount, as discussed above.

An inventive scanning probe microscope comprises an inventive mount. The advantages of such a scanning probe microscope result directly from the use of an inventive mount and are, therefore, identical with the advantageous already discussed with respect to the mount.

According to a further aspect of the invention, a method of mounting or dismounting an inventive scanning probe sensor package to/from an inventive mount comprises the steps of moving the at least one snap joint element from the first position to the second position, mounting or dismounting a scanning probe sensor package along the normal direction of the plane defined within the mount, and moving the at least one snap joint element from the second position to the first position. Moving the at least one snap joint element from the first position to the second position and vice versa can, in particular, be accomplished by use of an actuation element as it has been described above with respect to the inventive mount. Since the sensor package will be mounted or dismounted to/from the mount along a normal direction of the plane defined within the mount damaging of damageable elements like tiny electric contact pins or the like due to lateral movements during mounting can be avoided. Hence, using pins at the sensor package and/or the supporting structure of the mount, e.g. for electrical contacts, becomes easily possible.

Furthermore, according to another aspect of the invention, a mount for a scanning probe sensor package is provided which comprises:
  a support structure,
  at least one movable snap joint element located at the support structure and being designed for interacting with a respective counterpart in a scanning probe sensor package, the snap joint element being movable to a first position in which it exerts a force on a mounted scanning probe sensor package so as to force said scanning probe sensor package towards the support structure, and to a second position in which it allows a scanning probe sensor package to be mounted to or dismounted from the support structure,
  an actuation element being movable relative to the support structure and acting on the at least one snap joint element so as to bring it from the first position into the second position or vice versa through moving it relative to the support structure, and
an actuation motor connected to the support structure or to the actuation element so as to allow to conduct a relative movement between the actuation element and the support structure.

Such a mount may also comprise a positioning motor for positioning the support structure with respect to a sample to be probed and a stop position which defines maximum distance of the support structure from a sample. In this mount, the at least one movable snap joint element is located at the support structure and the actuation motor is given by the positioning motor. The actuation element is arranged such that it acts on the at least one snap joint element for bringing it into the second position when the support structure reaches the stop position.

Moreover, a further method of mounting or dismounting a scanning probe sensor package to a mount is provided, where the mount comprises a support structure, at least one movable snap joint element being designed for interacting with a respective counterpart in a scanning probe sensor package, an actuation element being movable relative to the support structure and acting on the at least one snap joint element, and a positioning motor for positioning the support structure with respect to a sample to be probed. The method comprising the steps of:
  moving the at least one snap joint element from a first position in which it exerts a force on a mounted scanning probe sensor package so as to force said scanning probe sensor package towards the support structure to a second position in which it allows a scanning probe sensor package to be mounted to or dismounted from the support structure,
  mounting or dismounting a scanning probe sensor package;
  moving the at least one snap joint element from the second position to the first position,
wherein moving the at least one snap joint element from the first position to the second position is done by acting on the at least one snap joint element through moving said actuation element relative to the support structure, and moving said actuation element relative to the support structure is done by moving the support structure to a given stop position by means of said positioning motor.

Further features, properties and advantages of the present invention will become clear from the following description of embodiments in conjunction with the accompanying drawings.

Figure 1:
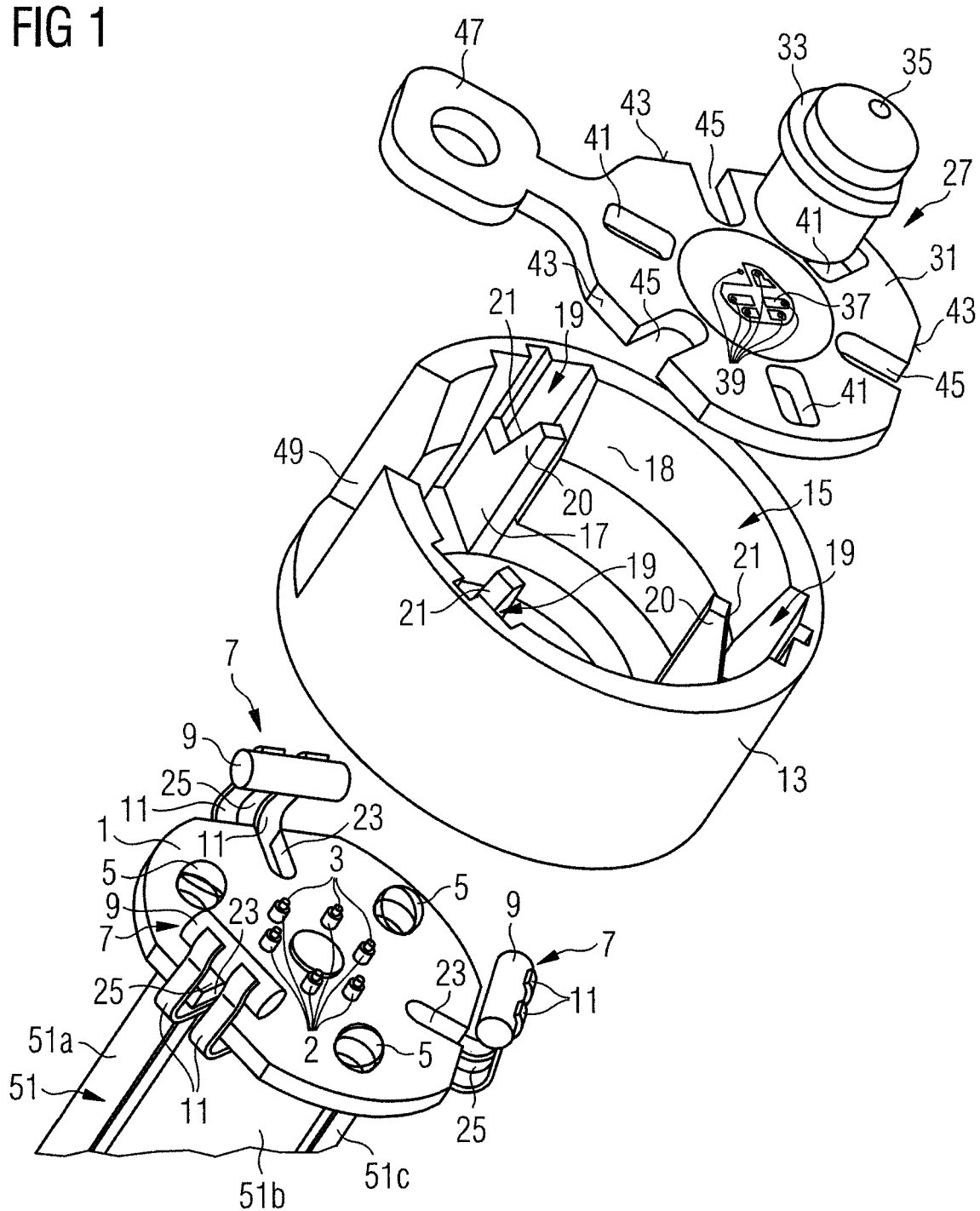
FIG. 1 shows a first embodiment of an inventive mount and an inventive scanning probe sensor package in an exploded view.
Figure 2:
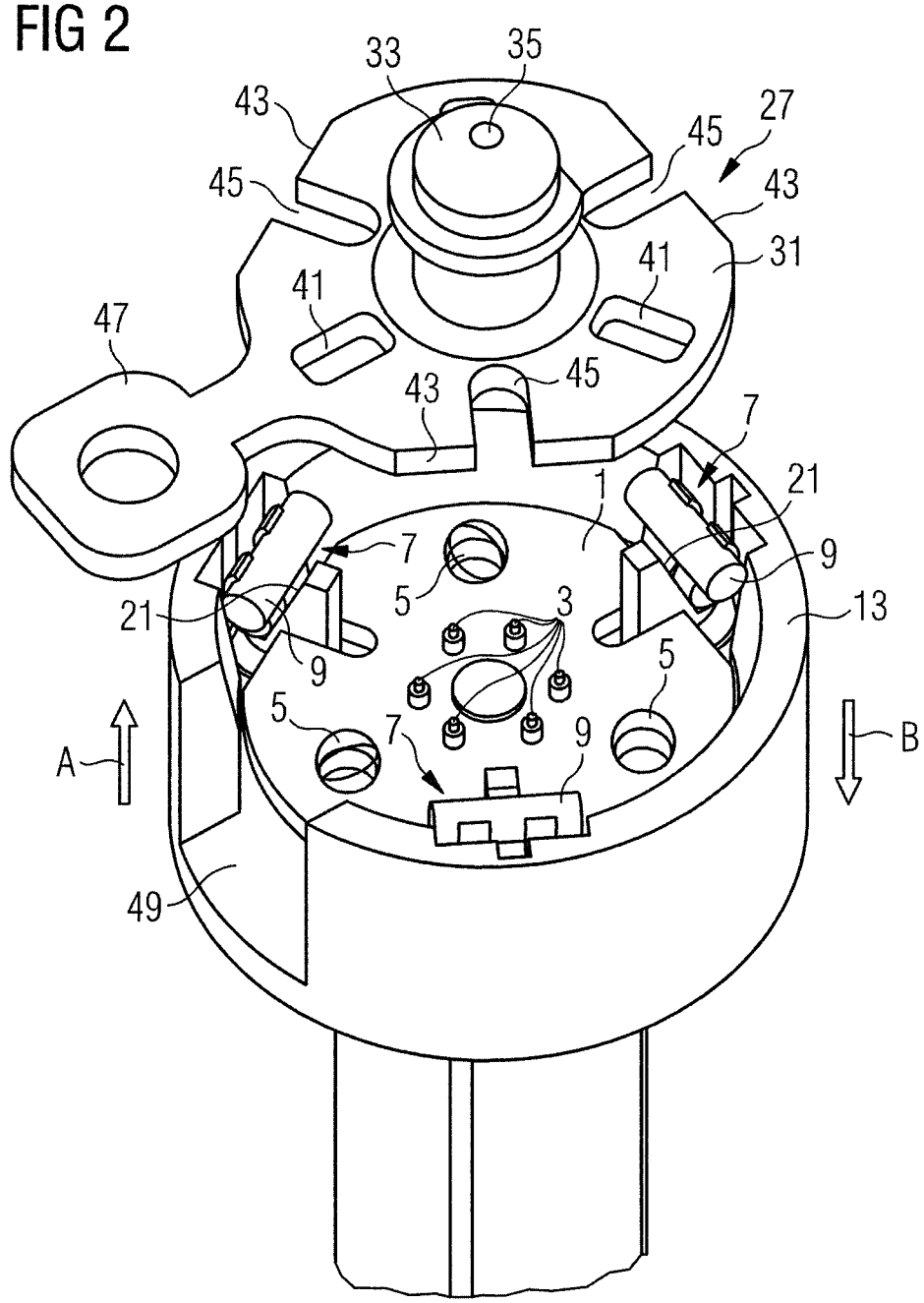
FIG. 2 shows the mount and the sensor package of FIG. 1 before mounting the sensor package to the mount in a perspective view.
Figure 3:
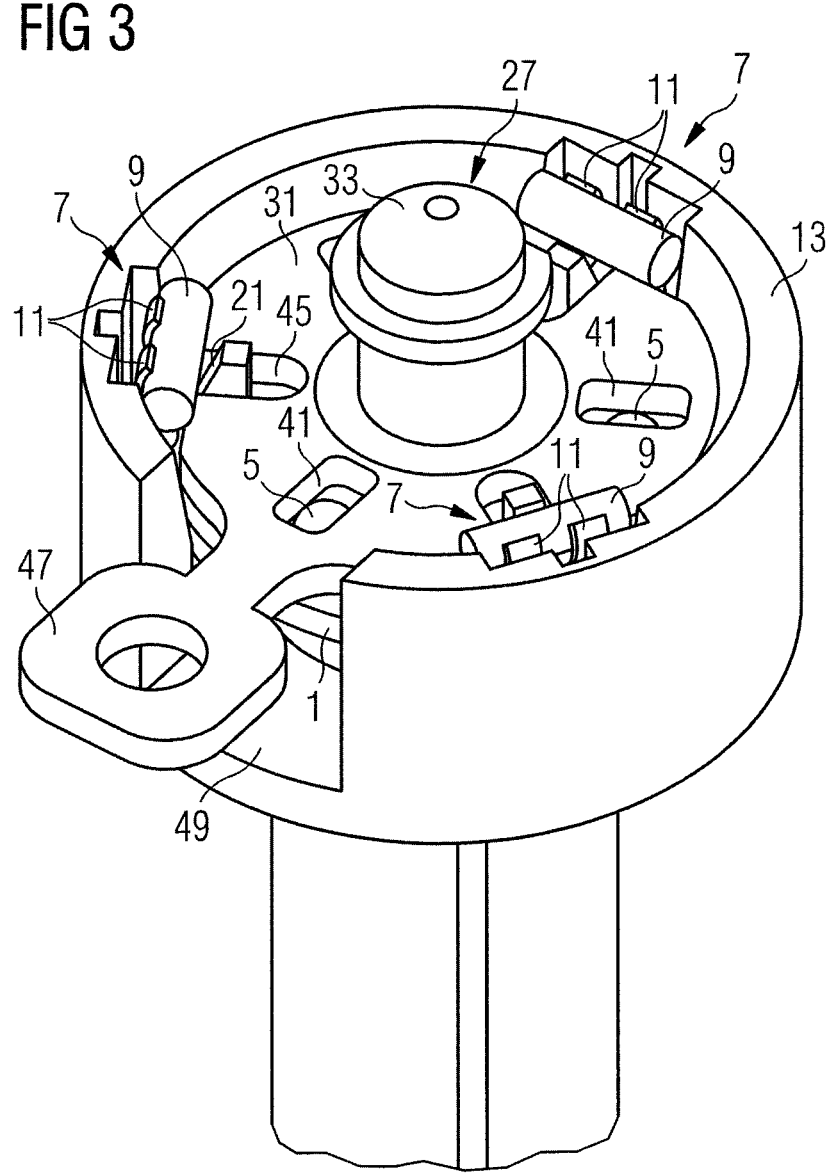
FIG. 3 shows the mount and the sensor package of FIG. 1 with the sensor package mounted to the mount, in a perspective view.
Figure 4:
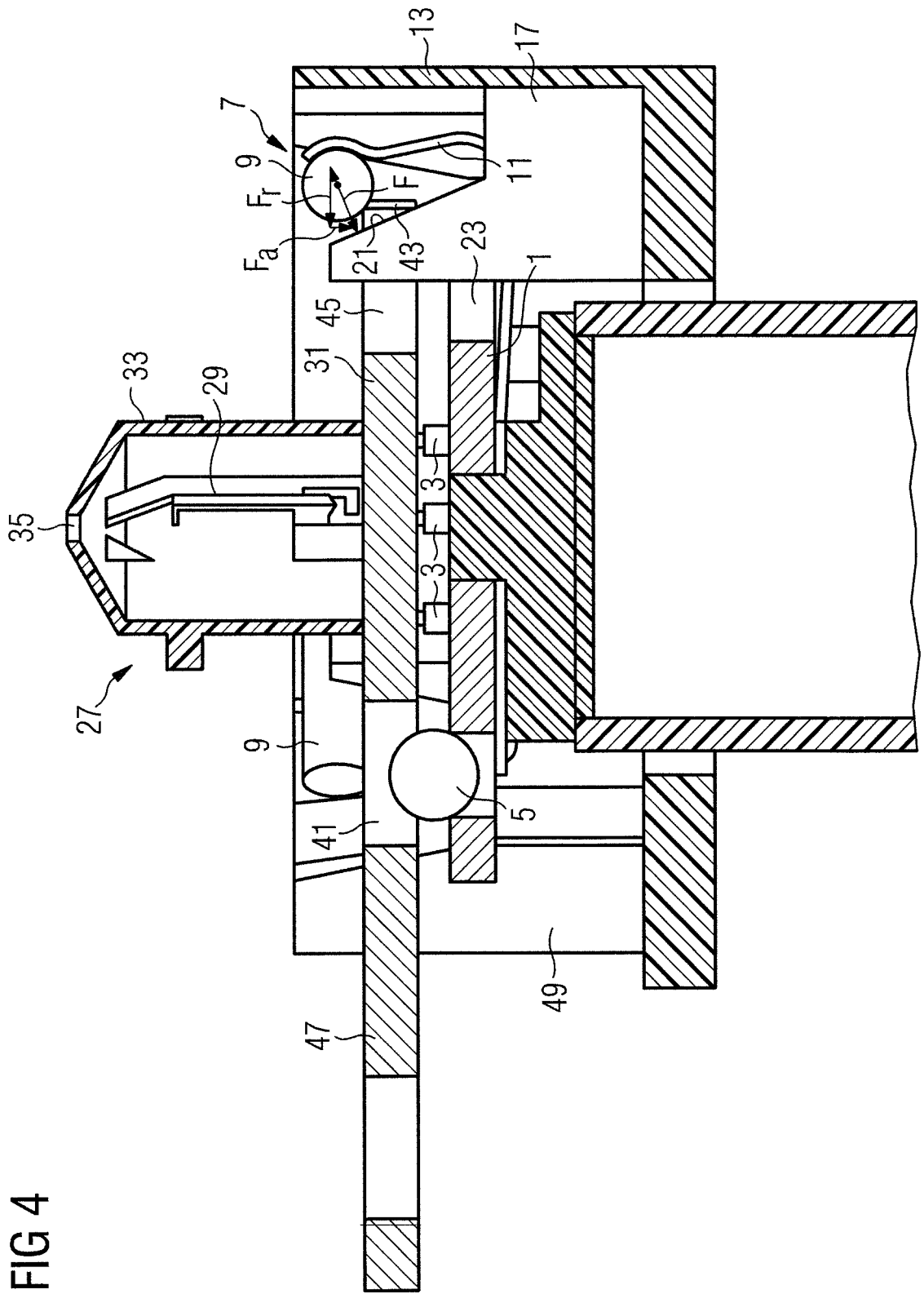
FIG. 4 shows the mount and the sensor package of FIG. 1 with the sensor package mounted to the mount in a sectional view.

A first embodiment of the inventive mount and the inventive scanning probe sensor package will be described with respect to FIGS. 1 to 4. While FIG. 1 shows the components of the mount and the sensor package in an exploded perspective view FIGS. 2 and 3 show the mount and the sensor package in a dismounted state and a mounted state, respectively. FIG. 4 shows the mount and the sensor package in a mounted state of the sensor package in a sectional view.

The inventive mount comprises a support structure in form of a support plate 1 in which electrical contact pins 2 are located which extend in normal direction of the support plate surface. Furthermore, three balls 5, which may be for example sapphire balls, are incorporated into the support plate 1 at the apexes of a notional isosceles triangle. The three balls 5 define a plane within the mount with respect to which a scanning probe sensor package will be oriented when it is mounted to the mount. The three balls 5 form a first part of a so called "kinematic mount". The amount by which the balls 5 and the amount by which the pins 2 project over the support plate 1 are adapted to each other so that the smaller diameter sections 3 of the pins 2 are inserted into contact openings of a scanning probe sensor package when it is mounted.

Three snap joint elements 7 are evenly distributed around the rim of the support plate 1. Each snap joint element 7 is formed by a cylinder 9 that is supported by the free ends of two resiliently bendable metal stripes forming a pair of legs 11 with the symmetry axis of the cylinder 9 being oriented perpendicular to the normal direction of the plane defined by the three balls 5. Preferably, the cylinders 9 are rotatably supported with the rotation axis being the symmetry axis of the cylinders 9. The other ends of the metal stripes are fixed to the support plate 1 or are at least fixed so as to be stationary with respect to the support plate 1. Each pair of legs 11 forms a resiliently bendable lever element at the free end of which the snap joint elements, i.e., the cylinders 9 in the present embodiment, are located. The legs 11 are bent such that their free ends are biased towards the centre of the support plate 1 and can be resiliently bent away from the centre against the spring force provided by the resilient material of the metal stripes.

In the inventive mount, the support plate 1 and the snap joint elements 7 together form a receptacle for receiving a scanning probe sensor package along the normal direction of the plane defined by the three balls 5.

The mount further comprises an annular wall element 13 with an insert opening through which a scanning probe sensor package can be inserted. Three projections 17 extend radially inwards from an inner wall surface 18 of the annular wall element 13. These projections 17 are evenly distributed over the circumference of the annular wall element 13 in a manner corresponding to the distribution of the snap joint elements 7 around the rim of the support plate 1. Furthermore, cut-outs 19 are present in the projections 17. These cut-outs 19 extend from the insert opening side of the projections 17 into the projections so that the radial inner part of the projection 17 forms a spike 20 with a slanted surface 21 showing radially outwards. The slanted surfaces 21 of the spikes 20 form guiding elements for the cylinders 9 of the snap joint elements as will be explained later.

The annular wall element 13 surrounds the base plate 1 of the mount and is mounted slidably along its axial direction, which corresponds to the normal direction of the plane defined by the balls 5. Slots 23 in the base plate 1 extend radially inwards from the base plate rim at the locations of the snap joint element 7 for receiving the projections 17. Moreover a gap is present between each two legs 11 forming a resiliently bendable lever element of a snap joint element 7. These gaps 25 are aligned with the slots 23 so that the projections 17 can engage the slots 23 through the gaps 25.

The slidably mounted annular wall element 13 can be moved to a first position in which the guiding surfaces 21 do not engage the cylinders 9 of the snap joint elements 7 and to a second position in which the cylinders 9 are engaged by the guiding surfaces 21. In case of engagement, the snap joint elements 7 will be spread radially outwards against the spring force provided by the legs 11 where the amount of spreading depends on the axial shifting position of the annular wall element 13. Hence, the annular wall element 13 forms an actuation element that acts through the slunted surfaces 21 on the snap joint elements 7 so as to allow to move them from a first position in which they are not spread to a second position in which they are spread by means of the slunted surfaces 21 by an amount defined by the axial position of the annular wall element 13. Recesses 24 formed in the inner wall element 13 allow for accommodating the cylinders 9 and part of the legs 11 in the spread condition of the snap joint elements 7.

Also shown in FIG. 1 is a scanning probe sensor package 27 that fits to the mount described so far. The sensor package 27 comprises a sensor element 29 (which is not visible in FIG. 1) that is mounted onto a base plate 31 of the sensor package and surrounded by a protective cover 33. The sensor element 29 comprises an atomically sharp tip which extends out of the protective cover 33 through a hole 35 in the cover which is located opposite to the base plate 31. An electrical circuit 37 of the sensor element 29 is printed onto the base plate and comprises contact elements 39 which are contacted by the pins 3 when the sensor package 27 is mounted to the mount.

To achieve a defined orientation of the base plate 31, and hence of the sensor element 29 with respect to the mount, three elongated holes 41 are provided. These holes 41 are located at the apexes of a notional isosceles triangle that coincides with the notional triangle at the apexes of which the balls 5 of the support plate 1 are located. The three balls 5 and the elongated holes 41 together form a kinematic mount in which the orientation of the sensor package 27 is defined by six contact points between the three balls and the side walls of the three elongated holes 41 (each hole provides two contact points with the respective ball inserted into the hole). In particular, when the sensor package 27 is mounted to the mount, its base plate 31 is substantially oriented in parallel to the plane defined by the three balls 5. However, small angles between the plane defined by the balls 5 and the plane in which the base plate 31 extends are possible, either by purpose or by accident, e.g. due to tolerances in the elements making up the kinematic mount.

The base plate 31 of the sensor package 27 has a generally circular shape with three straight sections 43 evenly distributed over the rim of the plate. A slot 45 extends radially inwards from the centre of each straight section 43 which is dimensioned such that the projections 17 of the annular wall element can interfere with the base plate 31 so as to allow inserting the sensor package 27 into the annular wall element 13 in order to mount it to the mount.

The allow for handling of the sensor package 27 without touching easily damageable parts a handle 47 extends from the base plate 31. In order to not hinder insertion of the sensor package 27 into the annular wall element 13 a cut out wall section 49 is present therein which receives the handle 47 when the sensor elements 27 is mounted to the mount.

FIG. 2 shows the scanning probe sensor package 27 before mounting it to the mount. The annular wall element 13 forms an actuation element for moving the snap joint elements 7 from the first position in which they would overlap the base plate 31 of a mounted sensor package to a second, spread position which would allow the base plate 31 of the sensor package 27 to be mounted to the mount without contacting the snap joint elements 7. Bringing the snap joint elements 7 from the first position, which is shown in FIG. 2, to the second position in which they are spread can be achieved by moving the slidably mounted annular wall element 13 in FIG. 2 upwards in the direction of the arrow A which coincides with the normal direction of the plane defined by the three balls 5. Hence, for mounting the scanning probe sensor package 27 to the mount the annular wall element 13 is to be moved upwards in the direction A so as to spread the snap joint element 7 against the spring force provided by the resilient material of the legs 11. When the cylinders 9 are supported rotatably by the legs 11 only a rolling resistance has to be overcome when the slanted surfaces 21 engage the cylinders 9 rather than a frictional resistance.

When the snap joint elements 7 are in their spread position the sensor package 27 can be moved down along the direction indicated by the arrow B in FIG. 2 until the balls 5 come into contact with the rims of the elongated holes 41 in the base plate 31 of the sensor package 27. Since a well defined orientation is achieved by the kinematic mount formed by the balls 5 in the support plate 1 and the elongated holes 41 in the base plate 31 the mounted sensor package 27 is in the right orientation for the contact pins 3 to engage the contact elements 39 of the base plate 31 (note that the contact elements are only visible in FIG. 1).

When the sensor package 27 has come to rest on the base plate 1 of the mount the annular wall element 13 is moved back again which returns the cylinders 9 of the snap joint elements 7 to the first position due to the spring force provided by the legs 11. The distance of the cylinders 9 in their first position from the support plate 1 is chosen such with respect to the thickness of the base plate 31 of the sensor package 27 that they exert forces F onto the base plate 31 having components $F_p$ parallel and radial $F_r$ to the mounting direction of the sensor package (see FIG. 4). While the radial components sum up to zero due to the symmetry of the snap joint arrangement the axial components sum up to a resulting force which forces the base plate 31 with the sensor package 27 towards the support plate 1 so as to fix the sensor package 27 in the mount. The mount with the scanning probe sensor package mounted thereon is shown in FIG. 3 in a prospective view and in FIG. 4 in a sectional view.

For dismounting a sensor package 27 from the mount the annular wall element 13 will again be moved along the direction A in FIG. 2 so as to bring the cylinders 9 of the snap joint elements 7 into the second position which allows to dismount the sensor package 27 from the mount without coming into contact with the snap joint elements 7.

Moving the annular wall element 13 may be done by hand or by means of an actuator acting on the annular wall element 13 to impart a sliding movement, e.g. by means of a piezoelectric motor which allows for a precise positioning of the annular wall element 13.

Although, the annular wall element 13 is slidably mounted in the embodiment described with respect to FIGS. 1 to 4, it can also be mounted in a fixed position. Typically, a scanning probe application comprises an actuator arrangement 51 for positioning the support plate 1 with a mounted sensor package 27 with respect to a sample to be probed in x-, y- and z-direction. Those actuators may, e.g., be implemented as piezoelectric motors 51a, 51b, 51c. Hence, the relative movement between the annular wall element 13 and the support plate 1 can be imparted by this actuator arrangement 51 without the need of an actuator especially provided for this purpose. In particular, the relative movement between the annular wall element 13 and the support plate 1 would be imparted by the actuator which is responsible for moving the support plate 1 in z-direction. The annular wall element 13 can, e.g., be fixed in space by fixing it to some component of the scanning probe application other than the support plate 1 or the components fixed thereto.

Moving the snap joint elements 9 from the first position to the second, spread position for mounting or dismounting a sensor package 27 can then be done by moving the support structure 1 relative to the annular wall element 13 by use of the actuator which is responsible for moving the support plate 1 in z-direction. In order to prevent the sensor package from falling out of the mount during positioning movements of the sensor with respect to a sample to be probed, a stop position can be provided which, e.g., resembles the maximum distance from the sample that can be achieved by means of actuator responsible for moving the support plate 1 in z-direction. Then the annular wall element 13 can be located such that spreading the snap joint elements 9 is only caused just before the stop position is reached by the support structure 1.

Figure 5:
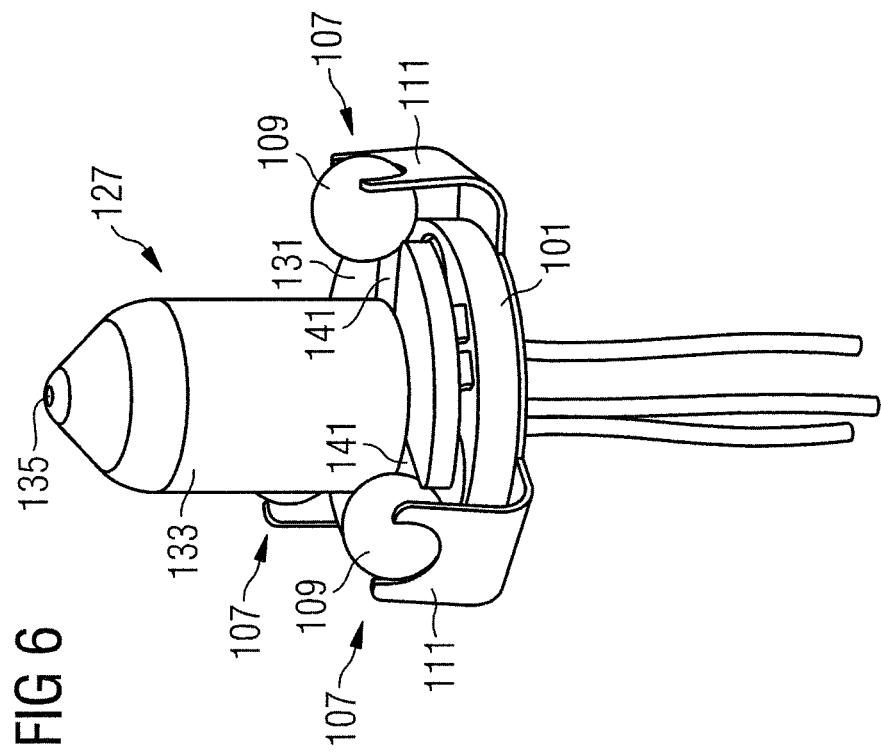
FIG. 5 shows a second embodiment of the inventive mount and the inventive scanning probe sensor package in a perspective view before mounting the sensor package to the mount.
Figure 6:
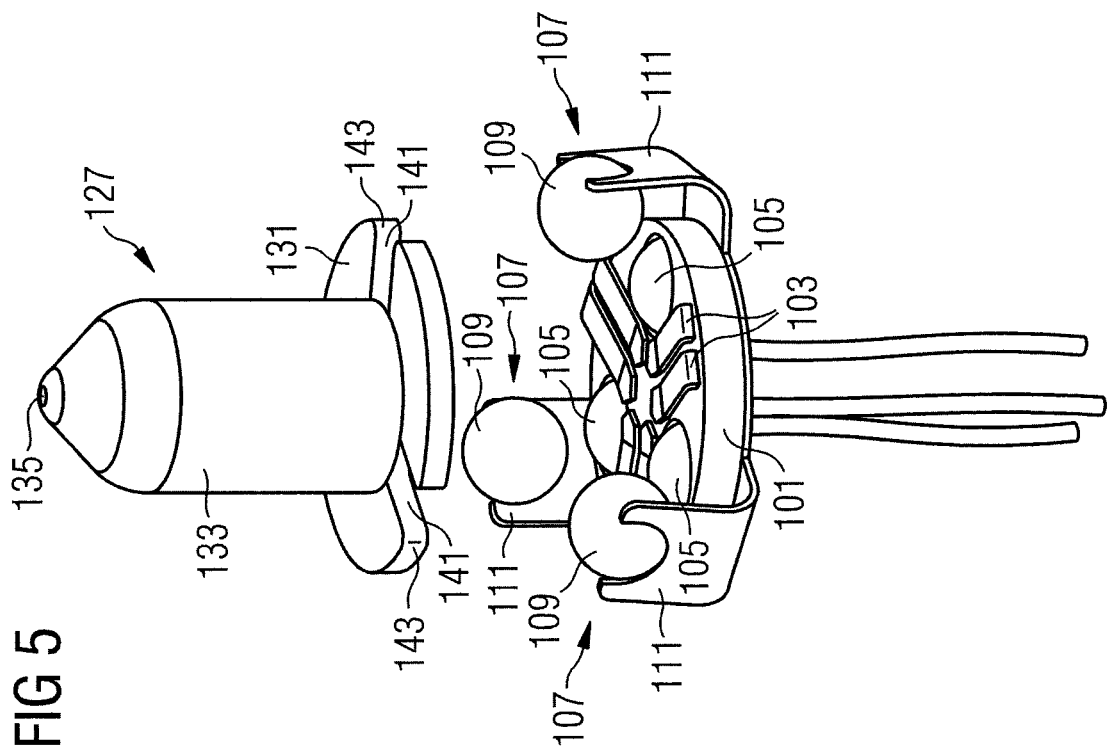
FIG. 6 shows the second embodiment with the sensor package mounted to the mount in a perspective view.

A second embodiment of the mount and the scanning probe sensor package is shown in FIGS. 5 and 6. While FIG. 5 shows the sensor package dismounted from the mount FIG. 6 shows the sensor package in the mounted state. The second embodiment is a modification of the first embodiment. Therefore, those features that have corresponding features in the first embodiment are denominated with the reference numerals of the first embodiment increased by 100, and will only be described again if they differ substantially from the first embodiment.

The main difference between the first embodiment and the second embodiment is that the scanning probe microscope sensor package 127 itself is used as an actuation element for moving the snap joint elements 107 to the second, spread position. Since there is no need for a guiding surface like guiding surface 21 of the projection 17 in the first embodiment to engage the snap joint element the legs can be made from a single piece of resilient material 111 in the second embodiment.

Another difference to the first embodiment lies in that balls 109 are used as the snap joint elements of the mount rather than cylinders. However, balls and cylinders are interchangeable in both embodiments. Like the cylinders the balls could be supported rotatably with a rotation axis that is perpendicular to the direction of mounting or dismounting the scanning probe sensor package 127.

A further difference lies in the mode of contacting the sensor which is provided by strip like contact elements 103 of the mount. However, pins and strips are, in general, interchangeable throughout the described embodiments.

A still further difference lies in that the diameter of the base plate 131 is reduced with respect to the base plate diameter of the first embodiment. As a consequence, the sensor part of the kinematic mount is implemented in form of slots 141 extending radially inwards from the rim of the base plate 131 rather than by elongated holes. The radial outer sections 143 of the slots 141 also serve as the snap joint sections of the base plate 131.

An advantage of the second embodiment shown in FIGS. 5 and 6 over the first embodiment shown in FIGS. 1 to 4 is that the mount does not need to have an actuation element like the annular wall element 13 of the first embodiment since spreading the snap joint elements 107 is done by the scanning probe sensor package 127 itself. Hence, the mount can be kept very small what makes it suitable for scanning probe microscopes with spatial restrictions at the location of the mount. However, in case the sensor package 127 is easily damageable the first embodiment is advantageous over the second embodiment in that the sensor package can be mounted without contacting the snap joint elements.

Amendments to the first and second embodiments are possible. For example, instead of using bent resilient legs for providing the spring force urging the snap joint elements towards the centre of the support plate linear coiled springs located, e.g., between the cylinders 9 and the inner surface of the annular wall element 13 could be used for urging the cylinders towards the centre of the mount.

Furthermore, the number of snap joint elements of the mount and snap joint sections of the sensor package base plate is not restricted to three. However, using three snap joint elements offer the advantage that an evenly distributed force urging the sensor package base plate towards the support plate can be provided with only a few snap joint elements. If only two snap joint elements would be used which are arranged at opposite ends of the support plate a tilt of the sensor package can not completely ruled out. However, in case the snap joint elements extend over a large circumferential fraction of the support plate two snap joint elements or even one snap joint element could be sufficient.

A third embodiment of the inventive mount will be described next with respect to FIG. 7. In this embodiment, the snap joint element is formed by a coiled annular spring which can be compressed by the base plate of the scanning probe sensor package when mounting it to, or dismounting it from, the mount.

The mount of the third embodiment comprises a more or less cylindrical wall 202 which extends from and surrounds the base plate 101. An annular recess 204 extends over the inner surface of the cylindrical wall. It serves as a seat for an annular coil spring 206 the radial inner part of which projects over the recess 204. The radial inner sections 208 of the coils of the annular coil spring 206 serve as the snap joint elements 207 of the present embodiment.

Figure 7:
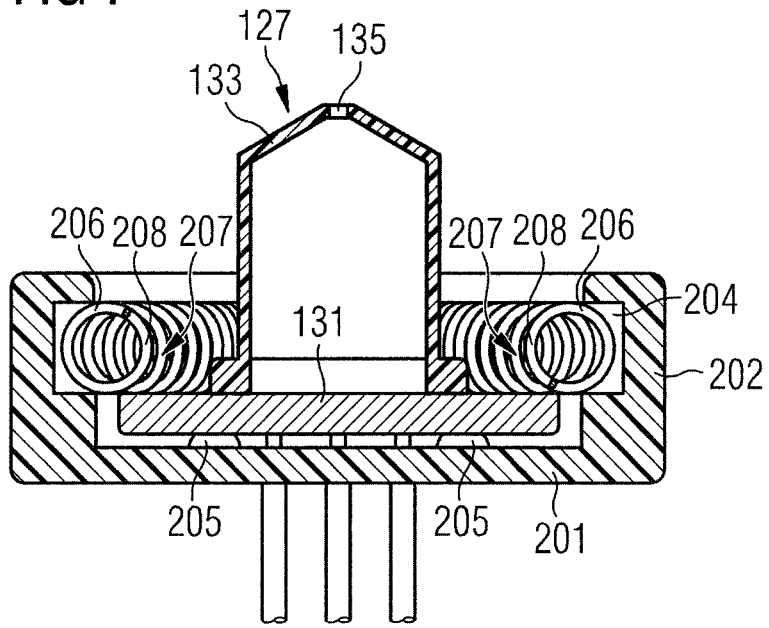
FIG. 7 shows a third embodiment of the inventive mount and the inventive scanning probe sensor package in a sectional view with the sensor package mounted to the mount.

The scanning probe sensor package of the embodiment shown in FIG. 7 corresponds to the sensor package of the second embodiment described with respect to FIGS. 5 and 6. It is therefore denominated with the same reference numerals as the sensor package of the second embodiment and will not be described again to avoid repetitions.

When the scanning probe sensor package 127 is mounted or dismounted to the mount of the third embodiment its base plate 131 presses onto the outermost parts 208 of the coils spring so as to compress the coils in radial direction. After the base plate 131 has passed the coil spring 206, the coils snap back into their original position. The thickness of the base plate 131 is chosen such with respect to the dimensions of the balls 205 and the slots 141 in the base plate 131 of the sensor package 127 that the coils of the coil spring 206 lock the sensor package 127 in place by urging it towards the balls 205 through providing a spring force onto the base plate 131 which has a component in parallel to the normal direction of the surface defined by the balls 205.

Modifications of the embodiment shown in FIG. 7 are possible. For example, the upper and/or lower side of the rim of the base plate maybe slanted in order to optimize the transfer of forces between of the coil spring 206 and the base plate 131. Note that slanted rims may also be advantageous in all other embodiments of the invention for optimizing the transfer of forces. In addition, like in the other embodiments, the base plate 131, or the cover 133, could be equipped with a handle.

Figure 8:
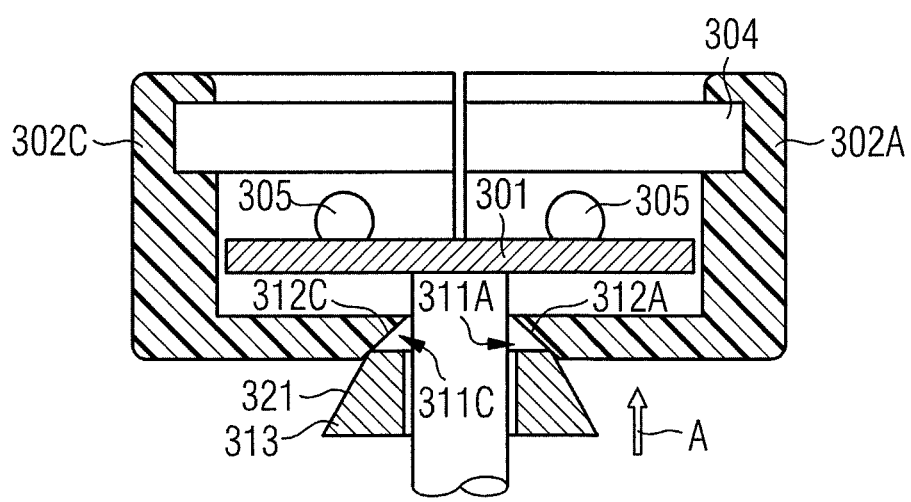
FIG. 8 shows a mount according to a fourth embodiment of the invention in a sectional view.
Figure 9:
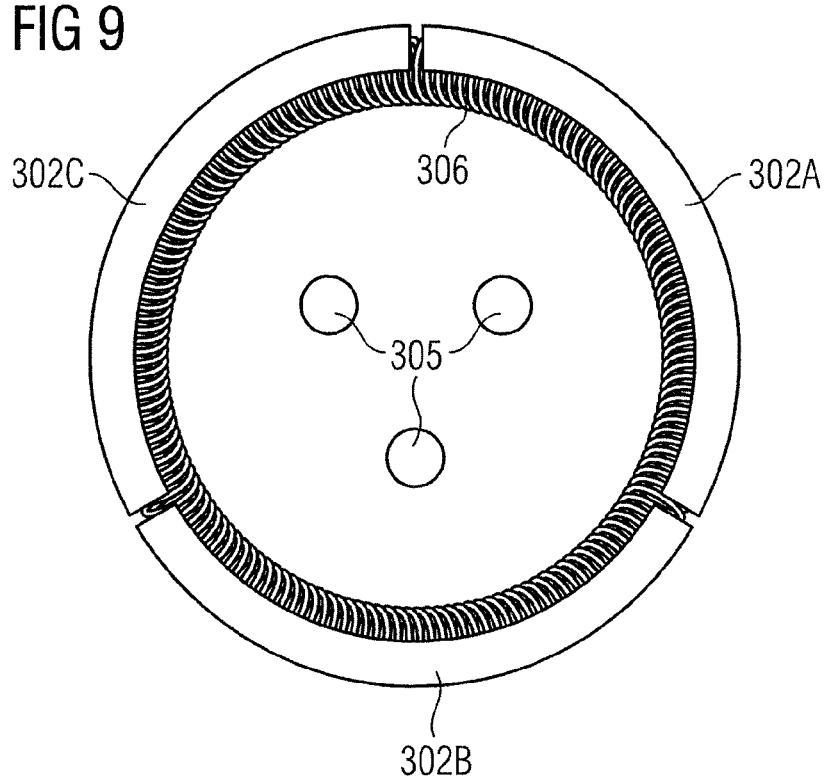
FIG. 9 shows the mount of FIG. 8 in a top view with the snap joint elements in a first position.
Figure 10:
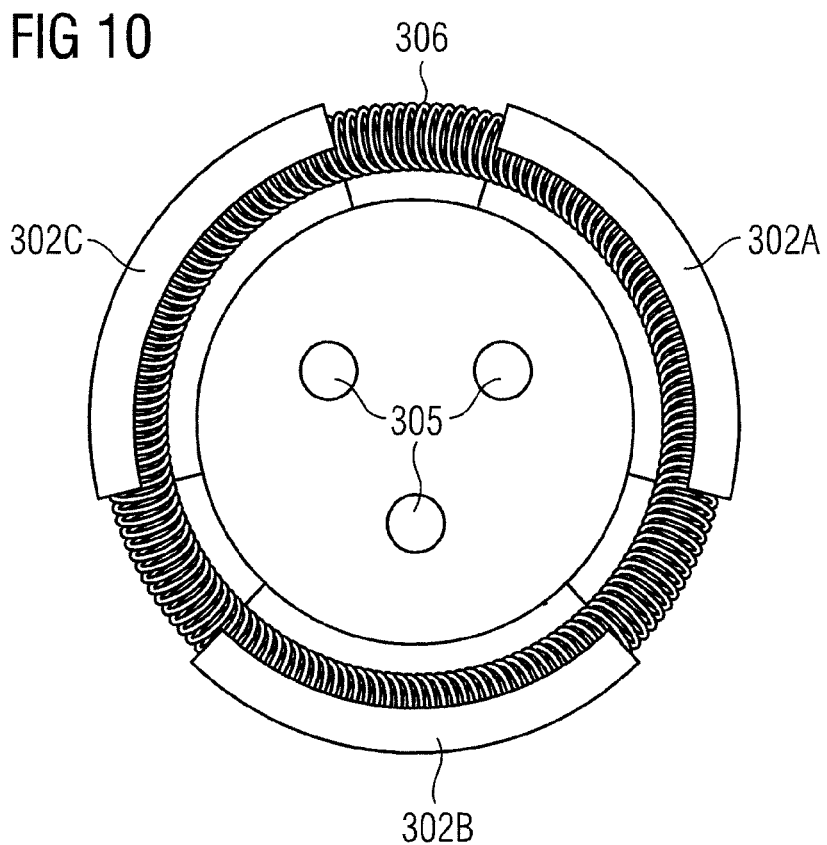
FIG. 10 shows the mount of FIG. 8 with the snap joint elements in a second position.

Furthermore, an actuation element could be present for spreading the annular coil spring when the sensor package 127 is mounted or dismounted. An example for such an actuation element is shown in FIGS. 8 to 10 as a fourth embodiment of the mount. In these Figures, the scanning probe sensor package, which does not differ from the sensor package of the third embodiment, is not shown to keep the Figures as simple as possible. Moreover, the coil spring is not shown in FIG. 8. While FIG. 8 shows the mount in a sectional view FIGS. 9 and 10 show the mount in top views.

In contrast to the mount of the third embodiment the mount of the forth embodiment comprises a cylindrical wall 302 which is composed of three independent wall sections 302A, 302B and 302C which are slidably mounted to the support plate 301. They are slidable in radial direction from a first, inner position which is shown in FIG. 9 to a second, outer position which is shown in FIG. 10. While the coil spring 306 (only shown in FIGS. 9 and 10) urges a mounted scanning probe sensor package towards the balls 305 when the wall sections 302A, 302B, 302C are in the first position, the sensor package can be mounted or dismounted without contacting the annular coil spring 306 when the wall sections 302A, 302B, 302C, to which the radial outer part of the annular coil spring 306 is fixed, are in the second position in which the annular coil spring 306 is spread. Moreover, the coil spring 306 provides a spring force which urges the wall sections 302A, 302B, 302C towards the first position (shown in FIG. 9) and which must be overcome to spread the wall sections to the second position (shown in FIG. 10).

Bringing the wall sections 302A, 302B, 302C into the spread position can be achieved by actuating a ring 313 with a conical outer surface 321. The ring 313 is slidably mounted to a guiding rod 315 extending from the support plate 301 in direction opposite to the mounting side of the plate. Faces 311A, 311B, 311C of the wall sections 302A, 302B, 3020 surrounding the guiding rod 315 form a funnel shaped opening through which the guiding rod 315 extends. Most of the sections of the conical outer surface 321 of the ring 313 are larger in diameter than the funnel shaped opening when the wall sections 302A, 302B, 302C are in the first position as shown in FIG. 8.

When the actuating ring 313 is moved along the arrow A in FIG. 8, the conical outer surface 321 of the ring 313 interacts with the funnel shaped surface sections 312A, 312B, 312C of the wall sections 302A, 302B, 302C so as to press the wall sections away from the guiding rod 315 against the spring force provided by the annular coil spring 306, thereby spreading the spring.

Although the wall sections 302A, 302B, 302C of the forth embodiment are slidable mounted to the support plate 301 they may as well be mounted so that each wall section 302 can be tilted about a tilt axis which is located at the rim of the support plate 301, or below the support plate 301, and which runs perpendicular to the normal direction of the plane defined by the balls 305. Note, that in this case the actuating ring needs to be adapted accordingly, for allowing to tilt the wall sections.

Note, that like in the first embodiment the sliding movement of the ring 313 can be imparted by an actuator, e.g. by a piezoelectric motor. Moreover, instead of slidably mounting the ring 313 the ring 313 could be mounted in a fixed position, e.g. by fixing it to some component of the scanning probe application other than the support plate 301 or the components fixed thereto. Like the relative movement between the annular wall element 13 and the support plate 1 in the first embodiment, the relative movement between the ring 313 and the support plate 301 could then be imparted by an actuator arrangement for positioning the mount with a mounted sensor. What has been said in this context with respect to the first embodiment is also applicable to the present embodiment.

The invention which has been described with respect to the Figures by way of illustration of specific embodiments allows for mounting and dismounting a scanning probe sensor package along a normal direction of a plane defined by the support structure. In case of a planar support structure the plane may, in particular, as well be the surface support structure. By the inventive design of the mount and the scanning probe sensor package it becomes, i. a., possible to use pins for providing electrical contact between the support structure and the sensor package without risking damaging the pins due to lateral movement. It is to be understood that other embodiments may be utilized and structural changes maybe made without departing from the scope of the invention.

REFERENCE NUMERAL 1 support plate
2 pin
3 smaller section of pin
4 scanning probe sensor package
5 ball
7 snap joint element
9 cylinder
11 leg 13 annular wall element
15 insert opening
17 projection
18 inner wall surface
19 cut-out
20 spike
21 guiding surface
23 slot
25 gap
27 sensor package
29 sensor element
31 base plate
33 protective casing
35 hole
37 electrical circuit
39 hole
41 elongated hole
43 straight section
45 slot
47 handle
49 cut out wall section
51 actuator arrangement
101 support plate
103 contact
105 ball
107 snap joint element
109 ball
111 leg
127 sensor package
133 protective cover
135 hole
141 slot
143 radial outer section
201 support plate
202 cylindrical wall
204 annular recess
205 ball
206 coil spring
207 snap joint element
208 radial inner section
301 support plate
302 wall section
304 annular recess
305 ball
306 coil spring
311 face
313 actuating ring
315 guiding rod
321 conical outer surface

The invention claimed is:

1. A mount for a scanning probe sensor package, the mount comprising:
   a support structure defining a plane within said mount;
   at least one movable snap joint element designed for interacting with a respective counterpart in a scanning probe sensor package,
   at least one resilient member for providing a biasing force biasing said at least one snap joint element towards a first position in which it projects in radial direction towards the center of said plane, and for exerting a force towards said support structure so as to force a mounted scanning probe sensor package towards said plane through said at least one snap joint, and
   wherein the snap joint element is movable against the biasing force provided by said at least one resilient member to a second position which is radially further away from the center of said plane as said first position and in which it allows a scanning probe sensor package to be mounted to or dismounted from said support structure along a normal direction of said plane.

2. The mount as claimed in claim 1, wherein the snap joint element is located at a movable element that is biased towards the center of the support structure by a spring force.

3. The mount as claimed in claim 2,
   wherein the movable element comprises a resiliently bendable lever element that has a stationary section which is fixed in its location with respect to the support structure and a free end section at which the snap joint element is located, and
   wherein the resiliently bendable lever element extends substantially in parallel to the normal direction of the plane and is shaped such as to bias the free end section with the snap joint element towards the center of the support structure.

4. The mount as claimed in claim 3, wherein the stationary section of the resiliently bendable element is fixed to the support structure.

5. The mount as claimed in claim 1, wherein the snap joint element shows rotational symmetry about a symmetry axis and is rotatably mounted with its symmetry axis being the rotation axis and with its symmetry axis oriented perpendicular with respect to the normal direction of the plane defined within the mount.

6. The mount as claimed in claim 1, comprising:
   at least three movable snap joint elements that are evenly distributed around a rim of the support structure.

7. The mount as claimed in claim 1, comprising:
   at least one coiled annular spring located at the periphery of the support structure so as to surround the support structure, wherein those sections of the coils that show towards the center of support structure form the snap joint elements.

8. The mount as claimed in claim 1, comprising:
   an actuation element arranged for acting on the at least one snap joint element so as to allow to move the snap joint element from the first position to the second position and vice versa by actuating the actuation element.

9. A scanning probe microscope comprising:
   a mount as claimed in claim 1.

10. A mount for a scanning probe sensor package, the mount comprising:
   a support structure;
   at least one movable snap joint element located at the support structure and being designed for interacting with a respective counterpart in a scanning probe sensor package, the snap joint element being movable:
   to a first position in which it exerts a force on a mounted scanning probe sensor package so as to force the scanning probe sensor package towards the support structure, and
   to a second position in which it allows a scanning probe sensor package to be mounted to or dismounted from the support structure;
   an actuation element being movable relative to the support structure and acting on the at least one snap joint element so as to bring it from the first position into the second position or vice versa through moving the actuation element relative to the support structure; and
   an actuation motor connected to the support structure or to the actuation element for moving the actuation element relative to the support structure.

11. The mount as claimed in claim 10, comprising:
   a positioning motor for positioning the support structure with respect to a sample to be probed; and a stop position which defines maximum distance of the support structure from a sample, wherein the at least one movable snap joint element is located at the support structure, wherein the actuation motor is given by the positioning motor, and wherein the actuation element is arranged such that it acts on the at least one snap joint element for bringing it into the second position when the support structure reaches the stop position.

12. The mount as claimed in claim 1, further comprising at least one contact pin which projects over the support structure.

13. A scanning probe sensor package comprising:

a sensor element;

a base to which said sensor element is fixed, said base extending along a base plane and comprising a rim with at least one snap joint section which is designed to interact with a snap joint element of a mount as claimed in claim 1 when said base plane is oriented in parallel to said plane defined by said support structure of said mount;

wherein said rim with said at least one snap joint section has an in-plane dimension which allows it to pass said at least one snap joint element along the normal direction of said plane defined within said mount when said snap joint element is in its second position and which does not allow it to pass said at least one snap joint element along the normal direction when said snap joint element is in its first position, and wherein said at least one snap joint section of said rim is designed for receiving said force towards said support structure exerted by said at least one resilient member through said at least one snap joint element so that said base with said sensor element fixed thereto is forced towards said plane defined by said support structure when said at least one snap joint section of said rim has passed said at least one snap joint element towards said plane.

14. The scanning probe sensor package as claimed in claim 13, comprising:

a handle section extending from the base.

15. A method of mounting or dismounting a scanning probe sensor package as claimed in claim 13 to or from the mount, comprising:

moving said at least one snap joint element against the biasing force provided by said at least one resilient member from said first position, in which it is biased towards the center of said plane, to said second position, in which it is further away from the center of said plane;

mounting or dismounting a scanning probe sensor package along the normal direction of said plane defined within said mount; and moving said at least one snap joint element back from said second position to said first position by means of said biasing force provided by said at least one resilient member.

16. A method of mounting or dismounting a scanning probe sensor package to or from a mount where the mount comprises a support structure defining a plane within the mount, at least one movable snap joint element being designed for interacting with a respective counterpart of a scanning probe sensor package, an actuation element being movable relative to the support structure and acting on the at least one snap joint element for moving it from a first position in which it projects in radial direction towards the center of said plane and exerts a force towards the support structure so as to force a mounted scanning probe sensor package towards said plane to a second position in which it is radially further away from the center of said plane and which allows a scanning probe sensor package to be mounted to or dismounted from the support structure along a normal direction of said plane, and a positioning motor for positioning the support structure with respect to a sample to be probed, the method comprising:

moving the at least one snap joint element from said first position to said second position by acting on said at least one snap joint element through moving said actuation element relative to said support structure, where moving said actuation element relative to said support structure is done by moving said support structure to a given stop position by means of said positioning motor;

mounting or dismounting a scanning probe sensor package along the normal direction of said plane; and moving the at least one snap joint element back from the second position to the first position.

* * * * *